(12) United States Patent
Sun et al.

(10) Patent No.: US 12,026,592 B2
(45) Date of Patent: Jul. 2, 2024

(54) MACHINE LEARNING MODEL TRAINING METHOD AND MACHINE LEARNING MODEL TRAINING DEVICE

(71) Applicant: HON HAI PRECISION INDUSTRY CO., LTD., New Taipei (TW)

(72) Inventors: Guo-Chin Sun, New Taipei (TW); Tung-Tso Tsai, New Taipei (TW); Tzu-Chen Lin, New Taipei (TW); Wan-Jhen Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 958 days.

(21) Appl. No.: 17/025,338

(22) Filed: Sep. 18, 2020

(65) Prior Publication Data
US 2021/0357806 A1    Nov. 18, 2021

(30) Foreign Application Priority Data
May 15, 2020    (CN) .......................... 202010415277.6

(51) Int. Cl.
*G06N 20/00*    (2019.01)

(52) U.S. Cl.
CPC .................................. *G06N 20/00* (2019.01)

(58) Field of Classification Search
CPC ...... G06F 16/583; G06N 20/00; G06N 3/045; G06N 3/084
See application file for complete search history.

(56) References Cited

U.S. PATENT DOCUMENTS

| 2021/0019652 A1* | 1/2021 | Gadelrab | G06F 11/3466 |
| 2021/0256310 A1* | 8/2021 | Roberts | G06N 20/00 |
| 2022/0180209 A1* | 6/2022 | Xu | G06N 3/08 |

FOREIGN PATENT DOCUMENTS

| CN | 107704859 | 2/2018 |
| CN | 108021986 | 5/2018 |
| CN | 109635918 | 4/2019 |
| CN | 109815991 | 5/2019 |
| CN | 110175911 | 8/2019 |
| TW | 202001696 | 1/2020 |

* cited by examiner

*Primary Examiner* — Brent Johnston Hoover
(74) *Attorney, Agent, or Firm* — ScienBiziP, P.C.

(57) ABSTRACT

A machine learning model training method includes receiving a problem type to be processed, determining a machine learning model corresponding to the problem type, receiving sample data to train the determined machine learning model, analyzing training results of the determined machine learning model obtained after training is completed and displaying the training results that meet preset conditions, and providing a machine learning model corresponding to the training result that meets the preset conditions.

15 Claims, 5 Drawing Sheets

MACHINE LEARNING MODEL TRAINING METHOD AND MACHINE LEARNING MODEL TRAINING DEVICE

FIELD

The subject matter herein generally relates to machine learning models, and more particularly to a machine learning model training method and a machine learning model training device.

BACKGROUND

At present, since there are many types of machine learning models, such as random forest, SVM, Naive Bayes, knn, gbdt, xgboost, LR, etc., it is difficult for people in the field to choose a suitable machine learning model to train sample data. The problem of poor training results from machine learning models that do not meet requirements. However, repeated training of the machine learning model takes too much time and cost, which seriously affects the training progress of the machine learning model.

BRIEF DESCRIPTION OF THE DRAWINGS

Implementations of the present disclosure will now be described, by way of embodiments, with reference to the attached figures.

DETAILED DESCRIPTION

Figure 1:
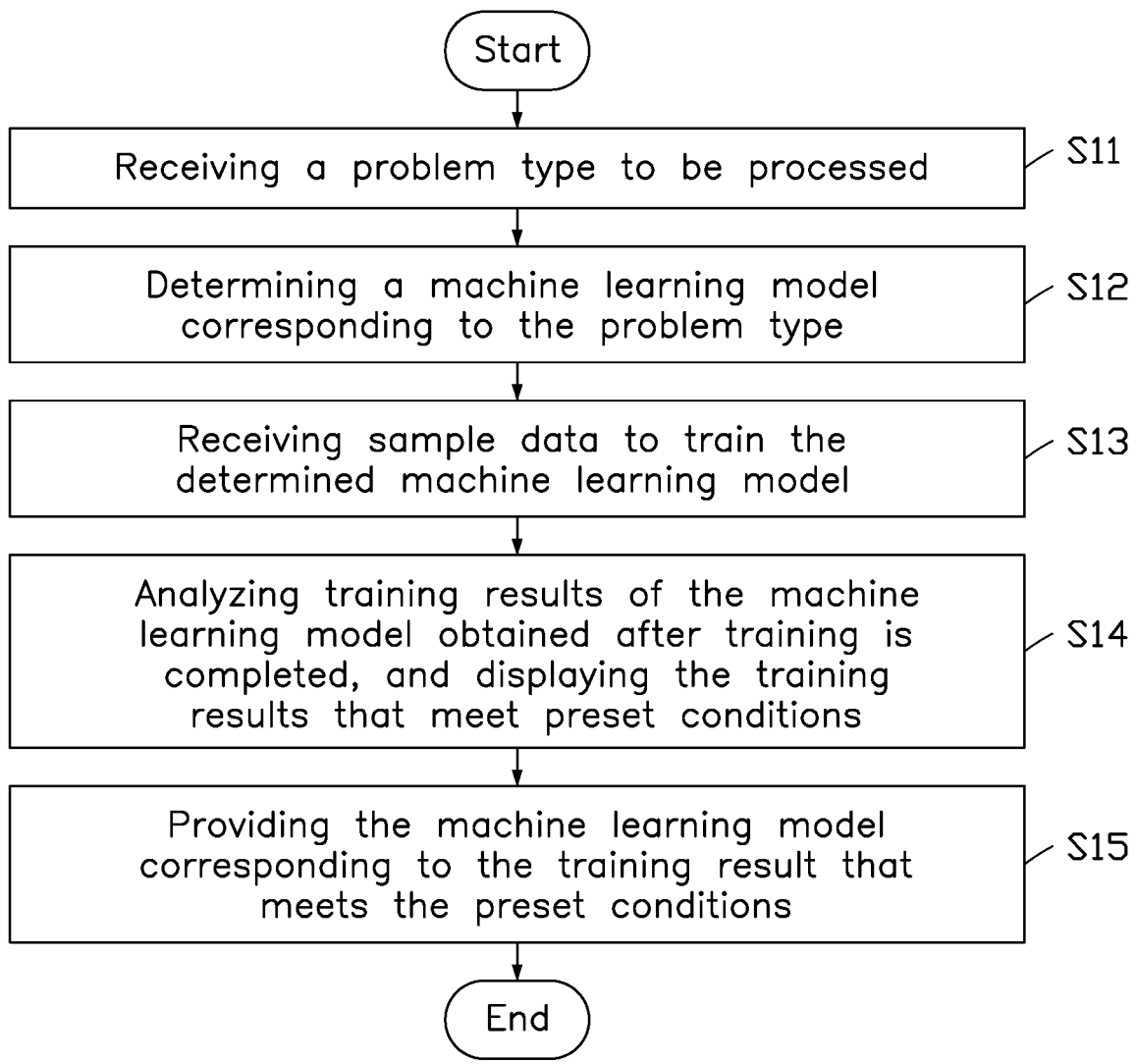
FIG. 1 is a flowchart of a machine learning model training method according to an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series, and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

In order to be able to understand the above objectives, features, and advantages of the present disclosure more clearly, the present disclosure will be described in detail below with reference to the accompanying drawings and specific embodiments. It should be noted that the embodiments of the application and the features in the embodiments can be combined with each other if there is no conflict.

In the following description, many specific details are set forth in order to fully understand the present disclosure. The described embodiments are only a part of the embodiments of the present disclosure, rather than all the embodiments. Based on the embodiments of the present disclosure, all other embodiments obtained by those of ordinary skill in the art without creative work shall fall within the protection scope of the present disclosure.

Unless otherwise defined, all technical and scientific terms used herein have the same meaning as commonly understood by those skilled in the technical field of the present disclosure. The terms used in the specification of the present disclosure herein are only for the purpose of describing specific embodiments and are not intended to limit the present disclosure.

Preferably, the machine learning model training method of the present disclosure is applied to one or more electronic devices. The electronic device is a device that can automatically perform numerical calculation and/or information processing in accordance with pre-set or stored instructions. Its hardware includes, but is not limited to, a microprocessor and an application-specific integrated circuit (ASIC), Field-Programmable Gate Array (FPGA), Digital Signal Processor (DSP), embedded devices, etc.

The electronic device may be a computing device such as a desktop computer, a notebook computer, a tablet computer, and a cloud server. The device can interact with the user through a keyboard, a mouse, a remote control, a touch panel, or a voice control device.

FIG. 1 is a flowchart diagram of an embodiment of a machine learning model training method. According to different needs, the order of blocks in the flowchart can be changed, and some blocks can be omitted or combined.

At block S11, a problem type to be processed selected by a user is received.

In one embodiment, the problem type is a type corresponding to a problem that can be solved by a machine learning model. Specifically, the problem types include object classification in an image, image segmentation, and object detection in an image.

In one embodiment, a method of receiving the problem type to be processed selected by a user includes: receiving the problem type to be processed selected by the user through a problem type selection interface 50.

Figure 2:
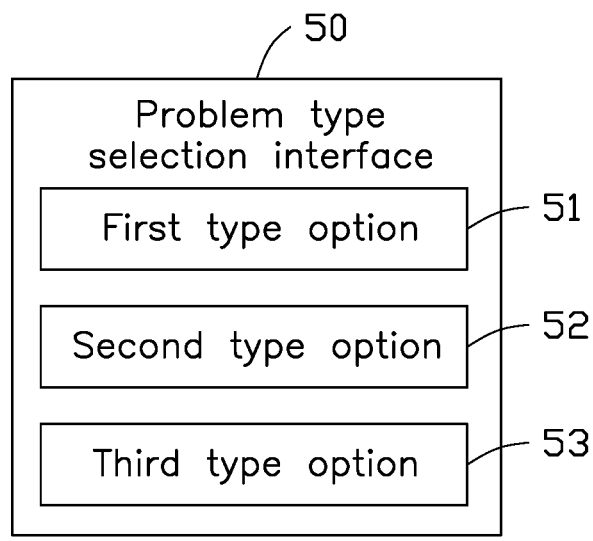
FIG. 2 is a schematic block diagram of a problem type selection interface.

FIG. 2 shows a schematic diagram of a problem type selection interface 50. The problem type selection interface 50 includes a first type option 51, a second type option 52, and a third type option 53. Among them, the first type option 51 is used for the user to select object classification in an image, the second type option 52 is used for the user to select segmentation of an image, and the third type option 53 is used for the user to select object detection in an image. That is, when the user selects the first type option 51, the problem type selection interface 50 receives the object classification in the image as the problem type; when the user selects the second type option 52, the problem type selection interface 50 receives the segmentation of an image as the problem type; when the user selects the third type option 53, the problem type selection interface 50 receives the object detection in the image as the problem type.

At block S12, a machine learning model corresponding to the problem type is determined.

In one embodiment, a method of determining the machine learning model corresponding to the problem type includes:

Searching a type and model relationship table 60 according to the problem type to determine the corresponding machine learning module, wherein the type and model relationship table 60 defines the corresponding relationship between multiple problem types and multiple machine learning models.

Figure 3:
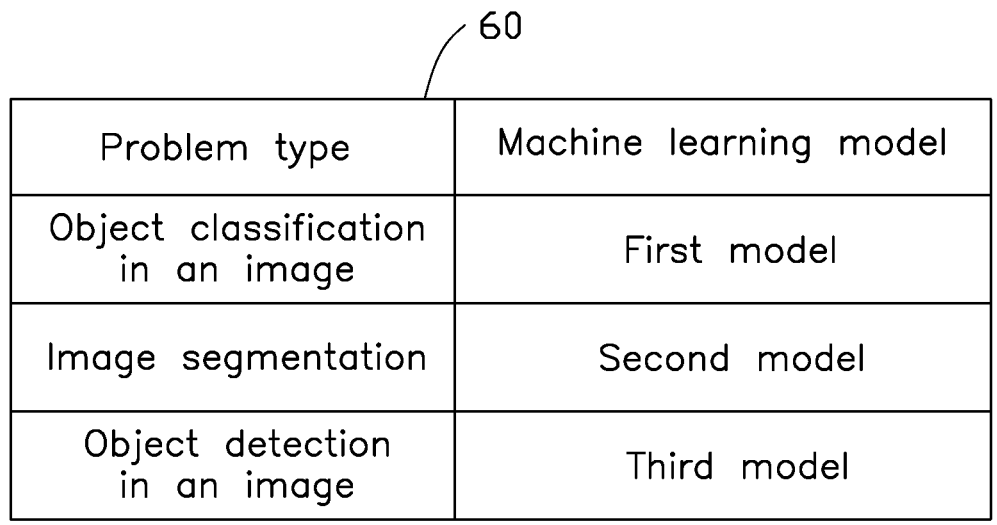
FIG. 3 is a schematic diagram of a problem type and machine learning model relationship table.

FIG. 3 shows a schematic diagram of a type and model relationship table 60. The type and model relationship table 60 defines the relationship between the problem type and the corresponding machine learning model. When the problem type is the object classification in an image, the corresponding machine learning model is defined as a first model. When the problem type is the segmentation of an image, the corresponding machine learning model is defined as a second model. When the problem type is the object detection in an image, the corresponding machine learning model is defined as a third model. In one embodiment, the first model, the second model, and the third model are at least one of random forest, SVM, Naive Bayes, knn, gbdt, xgboost, and LR.

In another embodiment, a method of determining the corresponding machine learning model corresponding to the problem type includes:

Receiving the machine learning model input by a user, and determining the received machine learning model as the machine learning model corresponding to the problem type. Determining the machine learning model input by the user as the machine learning model corresponding to the problem type can enable professional R&D personnel to add more machine learning models for sample training according to their own plans.

At block S13, sample data input by a user is received to train the determined machine learning model.

In one embodiment, the sample data includes at least a first sample data category and a second sample data category. A method of receiving the sample data input by a user to train the determined machine learning model includes:

1) Obtaining positive sample data and negative sample data of the sample data, and marking the sample category of the positive sample data, so that the positive sample data carries the mark of the sample category.

For example, the first sample category can be marked by "1", and the second sample category can be marked by "2".

2) Randomly dividing the positive sample data and the negative sample data into a training set with a first preset ratio and a verification set with a second preset ratio, training the machine learning model according to the training set, and verifying the trained machine learning model according to the verification set to verify the accuracy of the trained machine learning model.

In one embodiment, training samples of the training set are first distributed to different folders according to the sample category. For example, the training samples of the first sample category are distributed to a first folder, and the training samples of a second sample category are distributed to a second folder. Then, the training samples according to the first preset ratio (for example, 70%) are extracted from the different folders for training the machine learning model, and then the remaining training sample according to the second preset ratio (for example, 30%) are extracted from the different folders for verifying the accuracy of the trained machine learning model.

3) If the accuracy is greater than or equal to a preset accuracy, ending the training; if the accuracy is less than the preset accuracy, increasing the number of positive samples and the number of negative samples to retrain the machine learning model until the accuracy is greater than or equal to the preset accuracy.

In one embodiment, the machine learning model includes multiple convolution layers, maximum pool sampling layers, and fully connected layers. The convolution layers and the maximum pool sampling layers are alternately connected and used to extract feature vectors from the sample data. The fully connected layers are connected to each other. The last maximum pool sampling layer of the multiple maximum pool sampling layers is connected to the first fully connected layer of the multiple fully connected layers and is used to input the feature vectors obtained by feature extraction to the first fully connected layer. The last fully connected layer in the multiple fully connected layers is a classifier, and the classifier is used to classify the feature vectors to obtain a detection result.

In one embodiment, a method of receiving the sample data input by a user to train the determined machine learning model includes:

Establishing a training set according to the sample data (such as image data) and the category marks corresponding to the sample data;

Performing convolution and sampling operations on the sample data in the training set through the convolution layer of the machine learning model;

Connecting the last convolution layer to one or more fully connected layers, wherein the one or more fully connected layers are configured to synthesize the features of the sample data extracted after convolution and sampling operations and output training parameters and a feature model, wherein the feature model is an abstract feature expression of the sample data;

Determining whether the machine learning model meets a convergence condition, that is, whether the feature model is consistent with a preset standard feature model or the category mark of the sample data, wherein when the feature model is consistent with the preset standard feature model or the category mark of the sample data, it is determined that the machine learning model meets the convergence condition; otherwise, it is determined that the machine learning model does not meet the convergence condition;

Outputting the feature model when the feature model is consistent with the preset standard feature model; and Adjusting a weight matrix of the machine learning model through Backpropagation when the feature model does not meet the convergence condition.

In one embodiment, during the training process of the machine learning model, if there is an error between the output feature model and the standard feature model, the error information is transmitted back along the original path through Backpropagation, thereby adjusting each layer (such as training parameters of the convolution layer and the sampling layer). In one embodiment, the training parameters can include a weighted value and bias. Then the adjusted convolution layer and sampling layer perform convolution operations and sampling operations on the training data again, until the feature model meets the conditions. In one embodiment, when performing the convolution operation, multiple feature maps can be applied to the sample data to obtain different features of the sample data, wherein each feature map extracts a feature of the sample data. In one embodiment, methods such as average value combinations, maximum value combinations, and random combinations can be used to process the data in the training set when performing sampling operations.

At block S14, the training results of the machine learning model obtained after training is completed are analyzed, and the training results that meet the preset conditions are displayed.

In one embodiment, the training result is an accuracy, a precision, or a network size. The preset condition corresponding to the accuracy is greater than a first preset value (such as 90%). The preset condition corresponding to the precision is greater than a second preset value (such as 85%). The preset condition corresponding to the network size is the number of layers is less than a third preset value (such as 100). In one embodiment, the accuracy of the machine learning model is displayed when the accuracy of the machine learning model obtained after training is greater than the first preset value, the precision of the machine learning model is displayed when the precision of the machine learning model obtained after training is greater than the second preset value, and the network size of the machine learning model is displayed when the number of layers of the machine learning model obtained after training is less than the third preset value.

In one embodiment, the accuracy of the machine learning model is calculated according to the formula A=(TP+TN)/(TP+FP+FN+TN), wherein A is the accuracy, TP is the number of positive samples predicted to be positive by the machine learning model, FP is the number of negative samples predicted to be positive by the machine learning model, FN is the number of positive samples predicted to be negative by the machine learning model, and TN is the number of negative samples predicted to be negative by the machine learning model. In one embodiment, the precision of the machine learning model is calculated according to the formula P=TP/(TP+FP).

At block S15, the machine learning model corresponding to the training result that meets the preset conditions is provided to a user.

In one embodiment, the method further includes:

Receiving an operation of modifying the parameters of the machine learning model by a user when the training result of the machine learning model does not meet the preset conditions, and retraining the machine learning model according to the modified parameters. In one embodiment, a parameter setting interface (not shown in the figures) is provided, the operation of modifying the parameters of the machine learning model is received through the parameter setting interface, and the machine learning model is retrained according to the modified parameters.

In one embodiment, the method further includes:

Receiving a modification operation of a user on the type and model relationship table 60 and setting the correspondence between the problem type and the machine learning model according to the modification operation.

In one embodiment, the type of problem to be processed selected by the user is received, the machine learning model corresponding to the problem type is determined, the sample data input by the user is received to train the determined machine learning model, and the trained machine learning model corresponding to the training results meets the preset conditions is provided to the user, so that the user can quickly determine the corresponding machine learning model according to the problem type, thereby simplifying the process of selecting the machine learning model for training and improving the training efficiency of the machine learning model.

Figure 4:
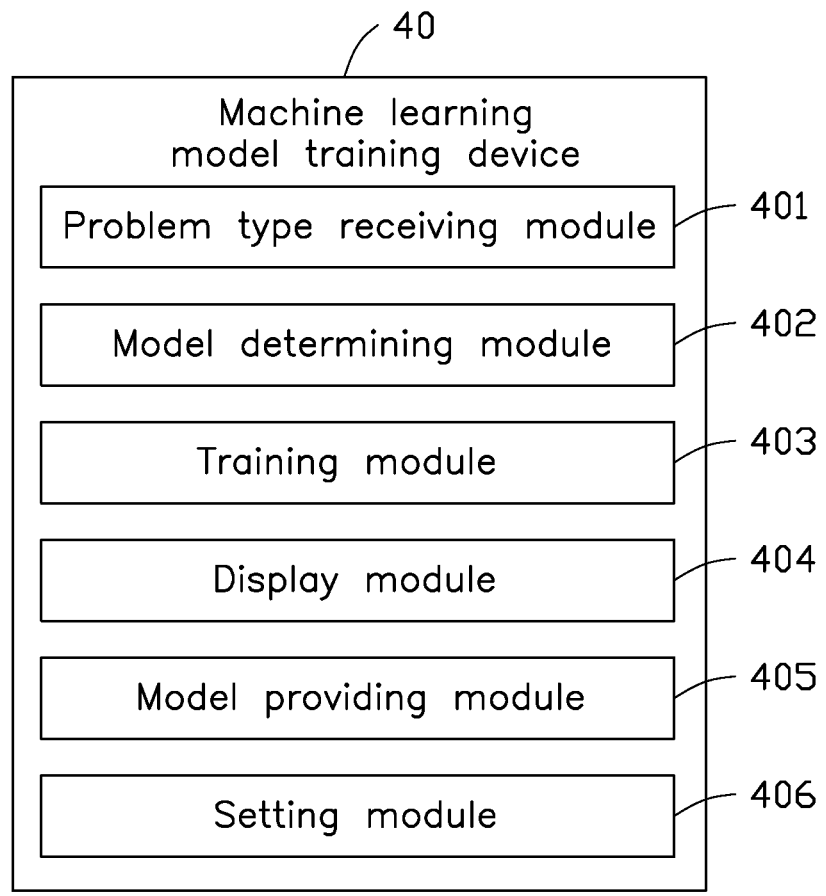
FIG. 4 is a schematic block diagram of a machine learning model training device.

FIG. 4 is a schematic block diagram of a machine learning model training device 40 according to an embodiment of the present disclosure.

In some embodiments, the machine learning model training device 40 runs in an electronic device. The machine learning model training device 40 may include multiple functional modules composed of program code segments. The program code segments in the machine learning model training device 40 can be stored in a memory and executed by at least one processor to perform functions of machine learning model training.

In one embodiment, the machine learning model training device 40 includes a problem type receiving module 401, a model determining module 402, a training module 403, a display module 404, a model providing module 405, and a setting module 406.

The problem type receiving module 401 receives the problem type to be processed selected by the user.

The model determining module 402 determines a machine learning model corresponding to the problem type.

The training module 403 receives sample data input by a user to train the determined machine learning model.

The display module 404 analyzes training results of the machine learning model obtained after training is completed and displays the training results that meet preset conditions.

In one embodiment, the training module 403 is further configured to receive an operation of modifying the parameters of the machine learning model by a user when the training result of the machine learning model does not meet the preset conditions, and retrain the machine learning model according to the modified parameters.

Figure 5:
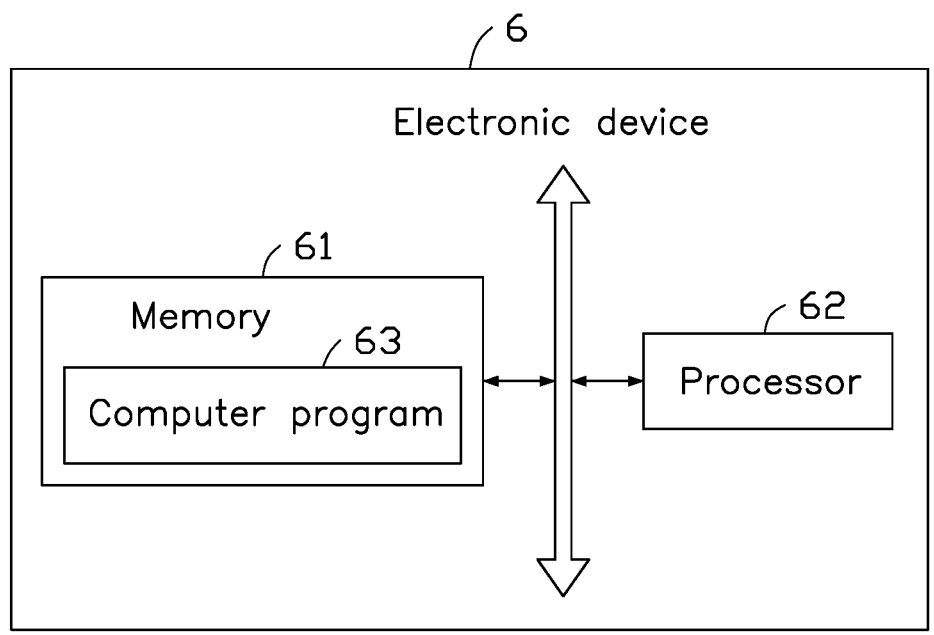
FIG. 5 is a schematic block diagram of an electronic device.

FIG. 5 is a schematic block diagram of an electronic device 6 according to an embodiment of the present disclosure.

The electronic device 6 includes a memory 61, a processor 62, and a computer program 63 stored in the memory 61 and executed by the processor 62. When the processor executes the computer program 63, the processor 62 implements the blocks in the machine learning model training method or executes the functions of the modules of the machine learning model training device 40.

The computer program 63 may be divided into one or more modules, and the one or more modules are stored in the memory 61 and executed by the processor 62. The one or more modules may be a series of computer program instruction segments capable of completing specific functions, and the instruction segments are used to describe the execution process of the computer program 63 in the electronic device 6. For example, the computer program 63 can be divided into the problem type receiving module 401, the model determining module 402, the training module 403, the display module 404, the model providing module 405, and the setting module 406 in FIG. 4.

In one embodiment, the electronic device 6 may also be a computing device such as a desktop computer, a notebook, a palmtop computer, and a cloud terminal device. Those skilled in the art can understand that the schematic diagram is only an example of the electronic device 6 and does not constitute a limitation of the electronic device 6. It may include more or fewer components than those shown in the figure or have a combination of certain components or have different components. For example, the electronic device 6 may also include input and output devices, network access devices, buses, and so on.

The processor 62 may be a central processing unit, other general-purpose processors, digital signal processors, application-specific integrated circuits, Field-Programmable Gate Array, or other programmable logic devices, discrete gates or transistor logic devices, discrete hardware components, etc. The general-purpose processor may be a microprocessor or the processor 62 may also be any conventional processor, etc. The processor 62 is the control center of the electronic device 6 and connects the various parts of the entire electronic device 6 through various interfaces and lines.

The memory 61 may be used to store the computer program 63 and/or modules. The processor 62 runs or executes the computer programs and/or modules stored in the memory 61 and calls the computer programs and/or modules stored in the memory 61. The data in the memory 61 realizes various functions of the electronic device 6. The memory 61 may mainly include a program storage area and a data storage area. The program storage area may store an operating system, an application program required by at least one function (such as a sound playback function, an image playback function, etc.), or the like; the data (such as audio data, phone book, etc.) created according to the use of the electronic device 6 is stored. In addition, the memory 61 may include a high-speed random access memory, and may also include a non-volatile memory, such as a hard disk, a memory, a plug-in hard disk, a smart memory card, and a secure digital card, Flash Card, at least one magnetic disk storage device, flash memory device, or another volatile solid-state storage device.

If the integrated modules of the electronic device 6 are implemented in the form of a software function module and sold or used as an independent product, it can be stored in a computer readable storage medium. Based on this understanding, the present disclosure implements all or part of the processes in the above-mentioned embodiments and methods and can also be completed by instructing relevant hardware through a computer program. The computer program can be stored in a computer-readable storage medium. When the computer program is executed by the processor, it can implement the steps of the foregoing method embodiments. Wherein, the computer program includes computer program code, and the computer program code may be in the form of source code, object code, executable file, or some intermediate forms. The computer-readable medium may include any entity or device capable of carrying the computer program code, recording medium, U disk, mobile hard disk, magnetic disk, optical disk, computer memory, read-only memory, Random Access Memory, electrical carrier signal, telecommunications signal, and software distribution media, etc. It should be noted that the contents contained in the computer-readable medium can be appropriately added or deleted according to the requirements of the legislation and patent practice in the jurisdiction. For example, in some jurisdictions, according to the legislation and patent practice, the computer-readable medium does not include electrical carrier signals and telecommunication signals.

In the several embodiments provided by the present disclosure, it should be understood that the disclosed electronic device and method may be implemented in other ways. For example, the electronic device embodiments described above are only illustrative. For example, the division of the modules is only a logical function division, and there may be other division methods in actual implementation.

In addition, the functional modules in the various embodiments of the present disclosure may be integrated into the same processing module, or each module may exist alone physically, or two or more modules may be integrated into the same module. The above-mentioned integrated modules can be implemented in the form of hardware or in the form of hardware plus software functional modules.

For those skilled in the art, it is obvious that the present disclosure is not limited to the details of the above exemplary embodiments, and the present disclosure can be implemented in other specific forms without departing from the spirit or basic characteristics of the present disclosure. Therefore, from any point of view, the embodiments should be regarded as exemplary and non-limiting. The scope of the present disclosure is defined by the appended claims rather than the above description, and therefore it is intended to fall within the claims. All changes within the meaning and scope of the equivalent elements are included in the present disclosure. Any reference signs in the claims should not be regarded as limiting the claims involved. In addition, it is obvious that the word "include" does not exclude other modules or steps, and the singular does not exclude the plural. Multiple modules or electronic devices stated in the claims of an electronic device can also be implemented by the same module or electronic device through software or hardware. Words such as first and second are used to denote names, but do not denote any specific order.

What is claimed is:

1. A machine learning model training method comprising:
receiving a problem type to be processed;
determining a machine learning model corresponding to the problem type;
receiving sample data to train the determined machine learning model, the sample data comprises positive sample data of positive samples and negative sample data of negative samples, wherein receiving the sample data to train the determined machine learning model comprises:
establishing a training set according to the sample data and category marks corresponding to the sample data;
performing convolution and sampling operations on the sample data in the training set through a convolution layer of the machine learning model;
connecting a last convolution layer to one or more fully connected layers, wherein the one or more fully connected layers are configured to synthesize the features of the sample data extracted after convolution and sampling operations and output training parameters and a feature model;
determining whether the machine learning model meets a convergence condition, wherein when the feature model is consistent with a preset standard feature model or the category mark of the sample data, it is determined that the machine learning model meets the convergence condition; or when the feature model is different from the preset standard feature model or the category mark of the sample data, it is determined that the machine learning model does not meet the convergence condition;
outputting the feature model when the feature model is consistent with the preset standard feature model; and
adjusting a weight matrix of the machine learning model through Backpropagation when the feature model does not meet the convergence condition;

analyzing training results of the determined machine learning model obtained after training is completed, and displaying training results that meet preset conditions, the training results comprises an accuracy of the machine learning model, the accuracy of the machine learning model is calculated according to a formula A=(TP+TN)/(TP+FP+FN+TN), A is the accuracy, TP is the number of the positive samples predicted to be positive by the machine learning model, FP is the number of the negative samples predicted to be positive by the machine learning model, FN is the number of the positive samples predicted to be negative by the machine learning model, and TN is the number of the negative samples predicted to be negative by the machine learning model; and providing a machine learning model corresponding to the training result that meets the preset conditions.

2. The machine learning model training method of claim 1, wherein determining the machine learning model corresponding to the problem type comprises:

searching a type and model relationship table according to the problem type, and determining the corresponding machine learning model; wherein:

the type and model relationship table defines corresponding relationship between a plurality of problem types and a plurality of machine learning models.

3. The machine learning model training method of claim 1, wherein the sample data comprises at least a first sample data category and a second sample data category, and receiving the sample data to train the determined machine learning model comprises:

obtaining positive sample data and negative sample data of the sample data, and marking a sample category of the positive sample data, so that the positive sample data carries a mark of the sample category;

randomly dividing the positive sample data and the negative sample data into a training set with a first preset ratio and a verification set with a second preset ratio, training the machine learning model according to the training set, and verifying the trained machine learning model according to the verification set to verify an accuracy of the trained machine learning model;

completing training the machine learning model in response that the accuracy is greater than or equal to a preset accuracy; and in response that the accuracy is less than the preset accuracy, increasing a number of the positive samples and a number of the negative samples to retrain the machine learning model, until the accuracy is greater than or equal to the preset accuracy.

4. The machine learning model training method of claim 1, wherein:

the training result is an accuracy, a precision, or a network size;

a preset condition corresponding to the accuracy is greater than a first preset value;

a preset condition corresponding to the precision is greater than a second preset value; and a preset condition corresponding to the network size is a number of layers is less than a third preset value.

5. The machine learning model training method of claim 1, wherein:

the machine learning model comprises a plurality of convolution layers, maximum pool sampling layers, and fully connected layers;

the convolution layers and the maximum pool sampling layers are alternately connected and configured to extract feature vectors from the sample data;

the fully connected layers are connected to each other;

the last maximum pool sampling layer of the plurality of maximum pool sampling layers is connected to the first fully connected layer of the plurality of fully connected layers and is configured to input the feature vectors obtained by a feature extraction to the first fully connected layer;

the last fully connected layer in the plurality of fully connected layers is a classifier, which classifies the feature vectors to obtain a detection result.

6. An electronic device comprising:

a processor; and a memory storing a plurality of instructions, which when executed by the processor, cause the processor to:

receive a problem type to be processed;

determine a machine learning model corresponding to the problem type;

receive sample data to train the determined machine learning model, the sample data comprises positive sample data of positive samples and negative sample data of negative samples, wherein the processor receives the sample data to train the determined machine learning model by:

establishing a training set according to the sample data and category marks corresponding to the sample data;

performing convolution and sampling operations on the sample data in the training set through the convolution layer of the machine learning model;

connecting a last convolution layer to one or more fully connected layers, wherein the one or more fully connected layers are configured to synthesize the features of the sample data extracted after convolution and sampling operations and output training parameters and a feature model;

determining whether the machine learning model meets a convergence condition, wherein when the feature model is consistent with a preset standard feature model or the category mark of the sample data, it is determined that the machine learning model meets the convergence condition;

or when the feature model is different from the preset standard feature model or the category mark of the sample data, it is determined that the machine learning model does not meet the convergence condition;

outputting the feature model when the feature model is consistent with the preset standard feature model; and adjusting a weight matrix of the machine learning model through Backpropagation when the feature model does not meet the convergence condition;

analyze training results of the determined machine learning model obtained after training is completed, and display training results that meet preset conditions, the training results comprises an accuracy of the machine learning model, the accuracy of the machine learning model is calculated according to a formula A=(TP+TN)/(TP+FP+FN+TN), A is the accuracy, TP is the number of the positive samples predicted to be positive by the machine learning model, FP is the number of the negative samples predicted to be positive by the machine learning model, FN is the number of the positive samples predicted to be negative by the machine learning model, and TN is the number of the negative samples predicted to be negative by the machine learning model; and provide a machine learning model corresponding to the training result that meets the preset conditions.

7. The electronic device of claim 6, wherein the processor determines the machine learning model corresponding to the problem type by:
searching a type and model relationship table according to the problem type, and determining the corresponding machine learning model; wherein:
the type and model relationship table defines corresponding relationship between a plurality of problem types and a plurality of machine learning models.

8. The electronic device of claim 6, wherein the sample data comprises at least a first sample data category and a second sample data category, and the processor receives the sample data to train the determined machine learning model by:
obtaining positive sample data and negative sample data of the sample data, and marking a sample category of the positive sample data, so that the positive sample data carries a mark of the sample category;
randomly dividing the positive sample data and the negative sample data into a training set with a first preset ratio and a verification set with a second preset ratio, training the machine learning model according to the training set, and verifying the trained machine learning model according to the verification set to verify an accuracy of the trained machine learning model;
completing training the machine learning model in response that the accuracy is greater than or equal to a preset accuracy; and
in response that the accuracy is less than the preset accuracy, increasing a number of the positive samples and a number of the negative samples to retrain the machine learning model, until the accuracy is greater than or equal to the preset accuracy.

9. The electronic device of claim 6, wherein:
the training result is an accuracy, a precision, or a network size;
a preset condition corresponding to the accuracy is greater than a first preset value;
a preset condition corresponding to the precision is greater than a second preset value; and
a preset condition corresponding to the network size is a number of layers is less than a third preset value.

10. The electronic device of claim 6, wherein:
the machine learning model comprises a plurality of convolution layers, maximum pool sampling layers, and fully connected layers;
the convolution layers and the maximum pool sampling layers are alternately connected and configured to extract feature vectors from the sample data;
the fully connected layers are connected to each other;
the last maximum pool sampling layer of the plurality of maximum pool sampling layers is connected to the first fully connected layer of the plurality of fully connected layers and is configured to input the feature vectors obtained by a feature extraction to the first fully connected layer;
the last fully connected layer in the plurality of fully connected layers is a classifier, which classifies the feature vectors to obtain a detection result.

11. A non-transitory storage medium having stored thereon instructions that, when executed by at least one processor of an electronic device, causes the least one processor to execute instructions of a machine learning model training method, the method comprising:
receiving a problem type to be processed;
determining a machine learning model corresponding to the problem type;
receiving sample data to train the determined machine learning model, the sample data comprises positive sample data of positive samples and negative sample data of negative samples, wherein the receiving the sample data to train the determined machine learning model comprises:
establishing a training set according to the sample data and category marks corresponding to the sample data;
performing convolution and sampling operations on the sample data in the training set through the convolution layer of the machine learning model;
connecting a last convolution layer to one or more fully connected layers, wherein the one or more fully connected layers are configured to synthesize the features of the sample data extracted after convolution and sampling operations and output training parameters and a feature model;
determining whether the machine learning model meets a convergence condition, wherein when the feature model is consistent with a preset standard feature model or the category mark of the sample data, it is determined that the machine learning model meets the convergence condition; or when the feature model is different from the preset standard feature model or the category mark of the sample data, it is determined that the machine learning model does not meet the convergence condition;
outputting the feature model when the feature model is consistent with the preset standard feature model; and
adjusting a weight matrix of the machine learning model through Backpropagation when the feature model does not meet the convergence condition;
analyzing training results of the determined machine learning model obtained after training is completed, and displaying training results that meet preset conditions, the training results comprises an accuracy of the machine learning model, the accuracy of the machine learning model is calculated according to a formula A=(TP+TN)/(TP+FP+FN+TN), A is the accuracy, TP is the number of the positive samples predicted to be positive by the machine learning model, FP is the number of the negative samples predicted to be positive by the machine learning model, FN is the number of the positive samples predicted to be negative by the machine learning model, and TN is the number of the negative samples predicted to be negative by the machine learning model; and
providing a machine learning model corresponding to the training result that meets the preset conditions.

12. The non-transitory storage medium of claim 11, wherein a method of determining the machine learning model corresponding to the problem type comprises:
searching a type and model relationship table according to the problem type, and determining the corresponding machine learning model; wherein:
the type and model relationship table defines corresponding relationship between a plurality of problem types and a plurality of machine learning models.

13. The non-transitory storage medium of claim 11, wherein the sample data comprises at least a first sample data category and a second sample data category, and a method of receiving the sample data to train the determined machine learning model comprises:
obtaining positive sample data and negative sample data of the sample data, and marking a sample category of the positive sample data, so that the positive sample data carries a mark of the sample category;

randomly dividing the positive sample data and the negative sample data into a training set with a first preset ratio and a verification set with a second preset ratio, training the machine learning model according to the training set, and verifying the trained machine learning model according to the verification set to verify an accuracy of the trained machine learning model;

completing training the machine learning model in response that the accuracy is greater than or equal to a preset accuracy; and in response that the accuracy is less than the preset accuracy, increasing a number of the positive samples and a number of the negative samples to retrain the machine learning model, until the accuracy is greater than or equal to the preset accuracy.

14. The non-transitory storage medium of claim 11, wherein:

the training result is an accuracy, a precision, or a network size;

a preset condition corresponding to the accuracy is greater than a first preset value;

a preset condition corresponding to the precision is greater than a second preset value; and a preset condition corresponding to the network size is a number of layers is less than a third preset value.

15. The non-transitory storage medium of claim 11, wherein:

the machine learning model comprises a plurality of convolution layers, maximum pool sampling layers, and fully connected layers;

the convolution layers and the maximum pool sampling layers are alternately connected and configured to extract feature vectors from the sample data;

the fully connected layers are connected to each other;

the last maximum pool sampling layer of the plurality of maximum pool sampling layers is connected to the first fully connected layer of the plurality of fully connected layers and is configured to input the feature vectors obtained by a feature extraction to the first fully connected layer;

the last fully connected layer in the plurality of fully connected layers is a classifier, which classifies the feature vectors to obtain a detection result.

* * * * *